United States Patent
Pento et al.

[11] Patent Number: 6,020,671
[45] Date of Patent: Feb. 1, 2000

[54] IN-LINE THERMOELECTRIC MODULE

[75] Inventors: Robert Pento, Algonquin, Ill.; James E. Marks, Glenville; Clifford D. Staffanson, S. Glens Falls, both of N.Y.

[73] Assignee: The United States of America as represented by the United States Department of Energy, Washington, D.C.

[21] Appl. No.: 09/122,853

[22] Filed: Jul. 28, 1998

[51] Int. Cl.[7] ........................................... H02N 3/00
[52] U.S. Cl. .................. 310/306; 136/200; 136/205; 136/211; 136/212
[58] Field of Search .................... 310/306, 307; 322/2 R; 136/200, 205, 211, 212, 203, 204, 230

[56] References Cited

U.S. PATENT DOCUMENTS

| | | | |
|---|---|---|---|
| 3,167,926 | 2/1965 | Wepfer et al. | 136/205 |
| 3,325,312 | 6/1967 | Sonntag, Jr. | 136/212 |
| 3,451,858 | 6/1969 | Dingwall | 136/205 |
| 3,505,123 | 4/1970 | Phillips | 136/205 |
| 3,981,751 | 9/1976 | Dashevsky et al. | 136/225 |
| 4,611,089 | 9/1986 | Elsner et al. | 136/230 |
| 4,802,929 | 2/1989 | Schock | 136/205 |
| 5,254,178 | 10/1993 | Yamada et al. | 136/204 |
| 5,429,680 | 7/1995 | Fuschetti | 136/203 |
| 5,456,081 | 10/1995 | Chrysler et al. | 62/3.7 |
| 5,644,184 | 7/1997 | Kucherov | 310/306 |

*Primary Examiner*—Nestor Ramirez
*Assistant Examiner*—Karl Imayoshi Tamai
*Attorney, Agent, or Firm*—William R. Moser; Paul A. Gottlieb

[57] ABSTRACT

A thermoelectric module with a plurality of electricity generating units each having a first end and a second end, the units being arranged first end to second end along an in-line axis. Each unit includes first and second elements each made of a thermoelectric material, an electrically conductive hot member arranged to heat one side of the first element, and an electrically conductive cold member arranged to cool another side of the first element and to cool one side of the second element. The hot member, the first element, the cold member and the second element are supported in a fixture, are electrically connected respectively to provide an electricity generating unit, and are arranged respectively in positions along the in-line axis. The individual components of each generating unit and the respective generating units are clamped in their in-line positions by a loading bolt at one end of the fixture and a stop wall at the other end of the fixture. The hot members may have a T-shape and the cold members an hourglass shape to facilitate heat transfer. The direction of heat transfer through the hot members may be perpendicular to the direction of heat transfer through the cold members, and both of these heat transfer directions may be perpendicular to the direction of current flow through the module.

18 Claims, 4 Drawing Sheets

IN-LINE THERMOELECTRIC MODULE

TECHNICAL FIELD

The present invention relates generally to means for converting thermal energy to electrical energy, and more particularly to an improved structure for a thermoelectric module for converting thermal energy to electrical energy. The Government has rights in this invention pursuant to Contract No. DE-AC12-76-SN00052 between the U.S. Department of Energy and the Lockheed Martin Company.

BACKGROUND OF THE INVENTION

Prior designs of thermoelectric modules comprise multiple units each utilizing a loading spring between a pair of cylindrical pistons, such as shown in FIG. 1, to ensure that the thermoelectric material is in both electrical and thermal contact with heating and cooling surfaces-and with electrical conductors. Such existing designs require many small intricate parts that are difficult and expensive to manufacture and are subject to premature failure. Furthermore, only relatively low power densities can be achieved with the planar layout of such prior designs. There is therefore a need for an improved thermoelectric design which minimizes working parts and maximizes the power density of the module.

SUMMARY OF THE INVENTION

It is therefore a principal object of the present invention to provide a thermoelectric module that overcomes the foregoing deficiencies of prior art thermoelectric modules.

Another object of the present invention is to provide a thermoelectric module design in which many of the same parts serve as both thermal and electrical conductors.

Other objects of the invention include providing a thermoelectric module that utilizes a unique in-line linear design requiring less parts than conventional modules, that has greater power density over that of traditional module designs, that has greater reliability over that of traditional module designs, that has improved temperature response over that of traditional module designs, and that utilizes an electrical conductor that also acts as a thermal conducting path for the module.

The foregoing objects and advantages of the present invention are achieved by a unique linear (in-line) design wherein the heating and cooling elements (shoes) serve as both thermal and electrical conductors. These elements are all stacked in-line with the major axis of the thermoelectric module, instead of being laid out in a planar configuration, such as employed by conventional designs. A much more compacted design is thereby realized. This compact design allows the power density to be maximized while minimizing the number of working parts.

The in-line design of the invention preferably utilizes heat transfer shoes of tubular copper for the "cold leg", and heat transfer shoes of solid copper for the "hot leg". However, both the cold leg and the hot leg transfer shoes may be tubular and may be of a conductive material other than copper.

It is also preferable that the cold leg shoes and the hot leg shoes are arranged perpendicular to each other because this is believed to maximize the conversion efficiency of the in-line design. However, the preferred perpendicular configuration of the design disclosed is not a prerequisite of the invention because the hot leg shoes and the cold leg shoes may be at any angle relative to each other, including parallel. Nevertheless, the use of other angles may decrease the conversion efficiency realized by the in-line design.

The design of a thermoelectric module disclosed is quite valuable for many commercial applications that utilize thermoelectric modules and thermoelectric materials. The configuration of the module lends itself especially to a variety of applications from automotive use to the recovery of waste heat in power plants for generating electricity.

The advantages of the thermoelectric module disclosed herein over prior art thermoelectric modules include a lesser number of working parts, a significant increase in power density, a significant lowering of manufacturing costs, and a substantial decrease in the likelihood of a premature failure of a working part of the thermoelectric module. These advantages are achieved by the in-line design of the module disclosed. The cooling medium flow path utilized by the in-line design increases both the module's efficiency and its power density.

BRIEF DESCRIPTION OF THE DRAWINGS

The structural features and operating principles of the present invention may be further understood by considering the detailed description as set forth below in conjunction with the accompanying drawings, in which.

DETAILED DESCRIPTION OF THE INVENTION

Figure 1:
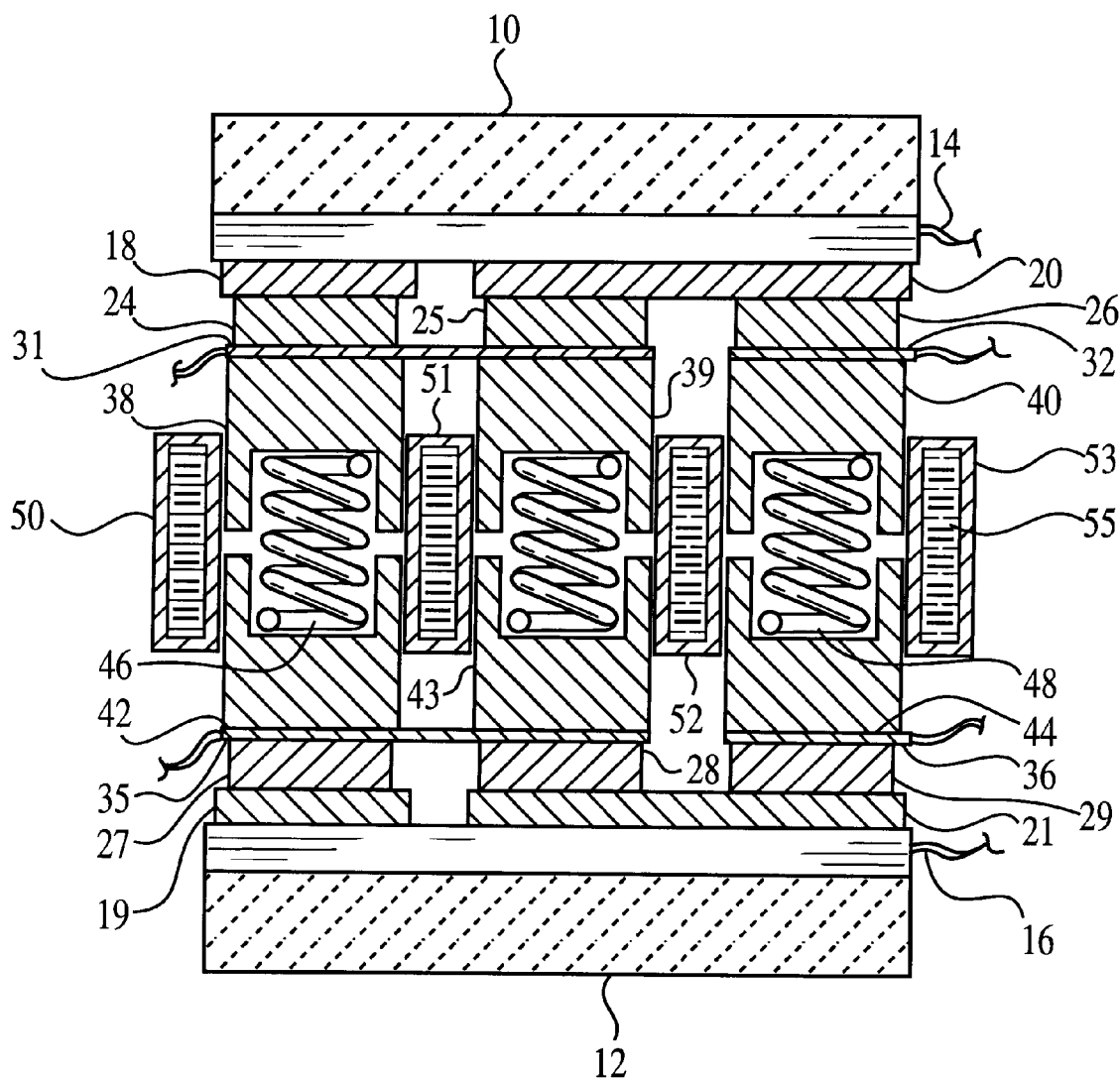
FIG. 1 is an elevational view in cross section illustrating a prior art design wherein the working parts of the thermoelectric module are arranged in a planar fashion as opposed to a linear fashion.

A thermoelectric module of conventional planar configuration is shown in FIG. 1. This module has a sandwich-like structure including a top insulating plate 10 and a bottom insulating plate 12, both of a ceramic material. Sandwiched between these plates are a top electric heater 14 and a bottom electric heater 16, two top conductors 18 and 20 and two bottom conductors 19 and 21 each of a material that conducts both heat and electricity, three top thermoelectric wafers 24–26, three bottom thermoelectric wafers 27–29, two top bus bars 31 and 32, two bottom bus bars 35 and 36, three top pistons 38–40, three bottom pistons 42–44, three compression springs 46–48, and four cooling tubes 50–53, each containing a liquid coolant 55, such as water.

The thermoelectric wafers 24–26 and 27–29 alternate between the P-type and the N-type. The thermoelectric wafers, conductors and bus bars are maintained in electrical and thermal contact by the compressive forces provided by the respective pistons as biased by their corresponding compression springs. The pistons are made either of a non-electrically conductive material, or a non-conductive layer is provided between the outer face of each piston and the portion of the bus bars in contact therewith. As evident from the foregoing, this design requires many intricate parts and involves a poor heat transfer arrangement, particularly between the cooling tubes and the sidewalls of the pistons adjacent thereto.

Figure 2:
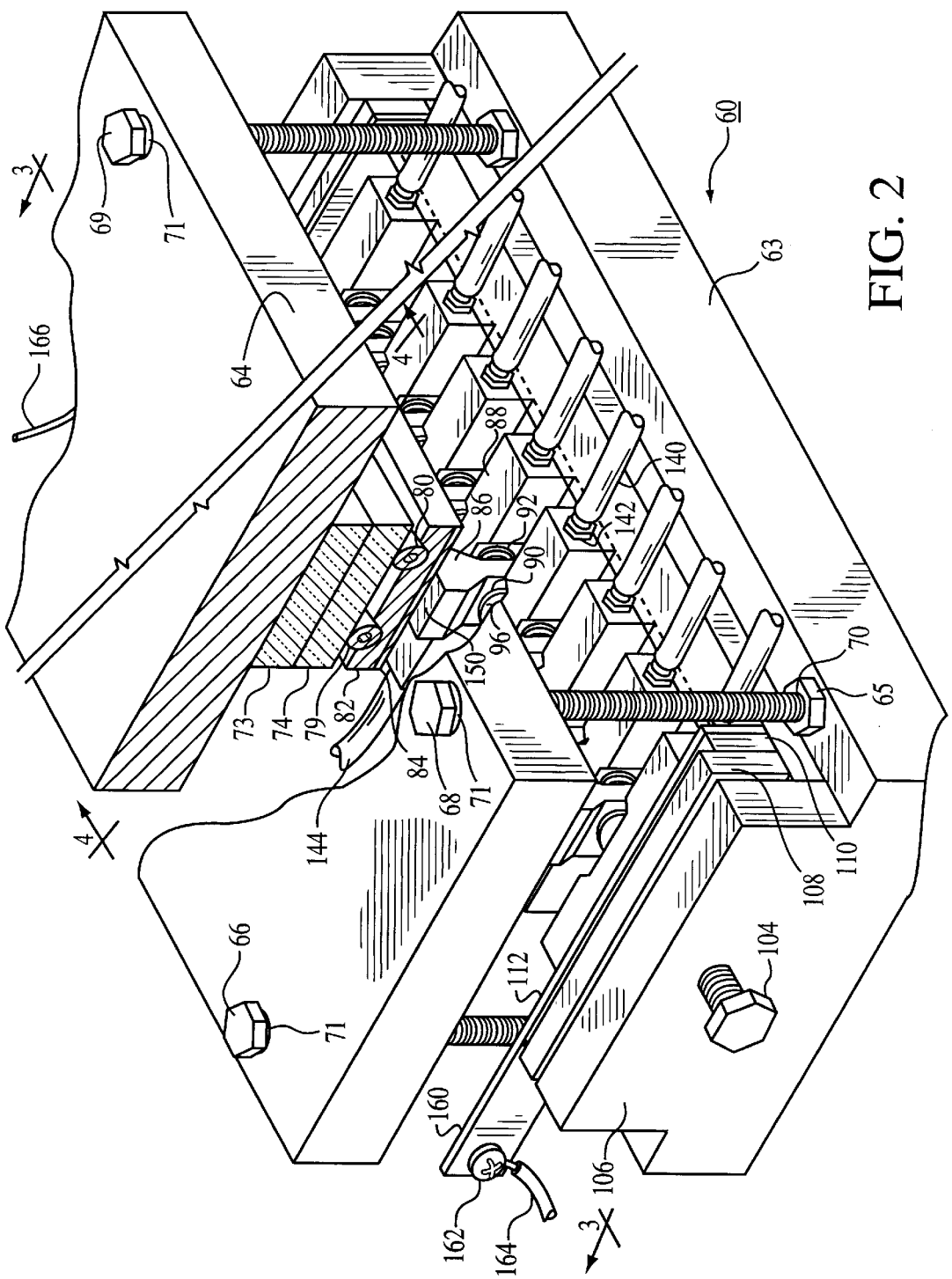
FIG. 2 is a fragmentary perspective view in partial section showing a thermoelectric module made in accordance with the teachings of the present invention and wherein the working parts are arranged in a linear fashion.
Figure 3:
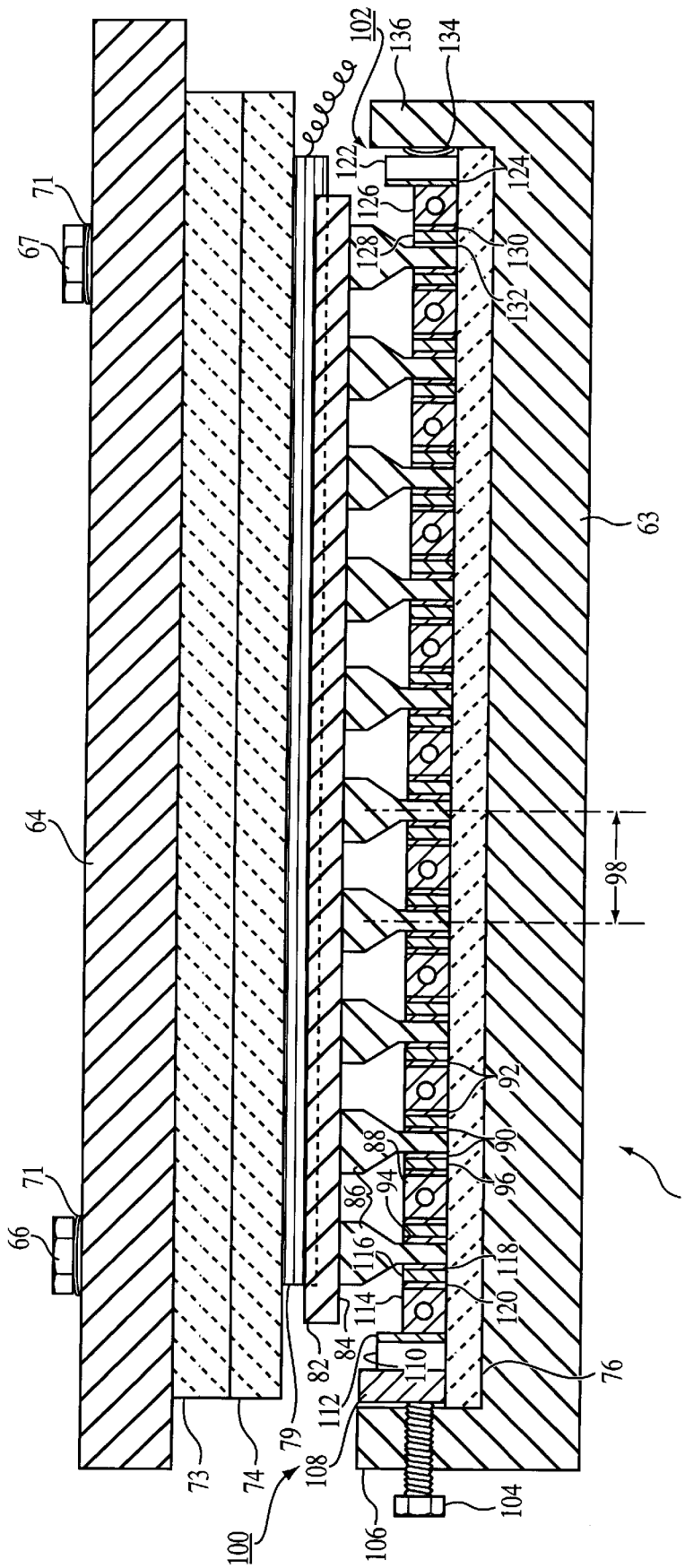
FIG. 3 is an side elevational view in section of the thermoelectric module as taken along line 3—3 of FIG. 2.

Referring now to FIGS. 2 and 3, there is shown a thermoelectric module in accordance with the present invention. This module comprises a mounting fixture, generally designated 60, which includes a lower mounting plate 63 and an upper mounting plate 64 secured together by four bolts 66–69, each of which has a shank 70 threaded into the lower mounting plate 63 and has a corresponding locking nut 65. Belleville washers 71 or other resilient means, such as leaf or coil springs, are placed between the bolt head and the upper surface of upper mounting plate 64 to take care of thermal expansion without rupturing the threaded shank of the bolt. The upper and lower mounting plates may be made of a high temperature plastic or a metal, such as aluminum.

Sandwiched between the upper and lower mounting plates 63 and 64 are a pair of upper insulating plates 73 and 74 and a lower insulating plate 76 each made of a ceramic material for providing both heat and electrical insulation. On the underside of the upper insulating plate 74 are a pair of cartridge heaters 79 and 80 mounted in grooves in a heater support plate 82, on the underside of which is an insulating layer 84 of a material that conducts heat but has good electrical insulating characteristics, such as mica. Clamped between the insulating layer 84 and the lower insulating plate 76 are a series of identical hot shoes 86. The hot shoes 86 and the cold shoes 88 are preferably made from solid copper and tubular copper, respectively. However, the hot shoes may also be of a tubular material, and both the hot and cold shoes may be of a conductive material other than copper.

Since the electricity generating elements between adjacent hot shoes are identical, only one set of these elements will be described here. Thus, between two adjacent hot shoes 86,86, is a cold shoe 88, a pair of tungsten shims 90,90, a pair of lead shims 92,92, a thermoelectric wafer 94 of a P-type thermoelectric material and a thermoelectric wafer 96 of an N-type of thermoelectric material. These elements, together with one-half of each of the abutting hot shoes, make up an electricity generating unit 98.

As also evident from FIG. 3, the tungsten shims 90,90 are in abutment with the hot shoes 86 and the lead shims 92,92 are in abutment with the cold shoes 88. These shims have been found to be desirable to prevent corrosion between the thermoelectric (T/E) materials and the copper of the hot and cold shoes. This corrosion may be in the form of eutectic formations caused by diffusion of the thermoelectric materials into the copper or vice versa, which forms a corrosion product such as a copper tellurium compound.

With further reference to FIG. 3, a special right end structure, generally designated 102, and a special left end structure, generally designated 100 are provided to place all of the electricity generating units under compression sufficient to provide firm and intimate contact for heat transfer and electrical conductivity between them. This in-line arrangement thereby maximizes power density and efficiency. The end structures 100 and 102 and the intervening electricity generating units 98 therebetween thus provide a unique "in-line" thermoelectric module.

The left end structure 100 includes a horizontal loading bolt 104 threaded through a left end wall 106 of the mounting fixture 60, a loading bar 108 engaged by the inner end of bolt 104, a left insulating bar 110 of a material providing electrical and heat insulation, a left bus bar 112 preferably made of copper, a left cold shoe 114, a left thermoelectric wafer 116 of the N-type, a left tungsten shim 118, a left lead shim 120, and the left one-half of the left most hot shoe 86. The right end structure 102 includes a right insulating bar 122, a right bus bar 124 preferably made of copper, a right cold shoe 126, a right thermoelectric wafer 128 of the P-type, a right lead shim 130, a right tungsten shim 132, and the right one-half of the right most hot shoe 86. The cold shoes, thermoelectric wafers, and shims of the left and right end structures 100 and 102 are the same as the corresponding elements of the intermediate electricity generating units 98.

The right end structure also includes a Belleville washer 134 or other resilient means, such as a leaf or coil spring type element, for preventing the application of excessive stresses to any of the in-line elements during thermal expansion. Washer 134 abuts a right end wall 136 of the lower mounting plate 63.

As evident from FIG. 3, tightening of the loading bolt 104 compresses together all of the in-line elements positioned between the end walls 106 and 136 of the lower mounting plate 63 to provide firm and intimate contact between all of the electricity generating units clamped between the respective bus bars 112 and 124. This cold preload may be relatively high, such as 10,000 psi, provided sufficient Belleville washers or similar resilient means are employed to prevent much of an increase above this loading due to thermal expansion. In addition to improved electrical contacts, this in-line compression arrangement also provides good heat transfer contact between the cold shoes, the hot shoes and the thermoelectric wafers.

In similar fashion, the tightening of the vertical loading bolts 66–69 provide intimate heat transfer contact between the cartridge heaters 79 and 80 on the one hand, and the top contact surfaces 150 of the hot shoes 86 on the other hand, such that there also is excellent heat transfer between the heaters and the thermal electric wafers.

Each of the bus bars 112 and 124 have an outwardly projecting end portion 160 providing a terminal 162 to which an electrical lead is attached for connecting the module to an electrical circuit, the left lead 164 and the right lead 166 being shown in FIG. 2, along with only the projecting portion 160 of left bus bar 112.

Figure 4:
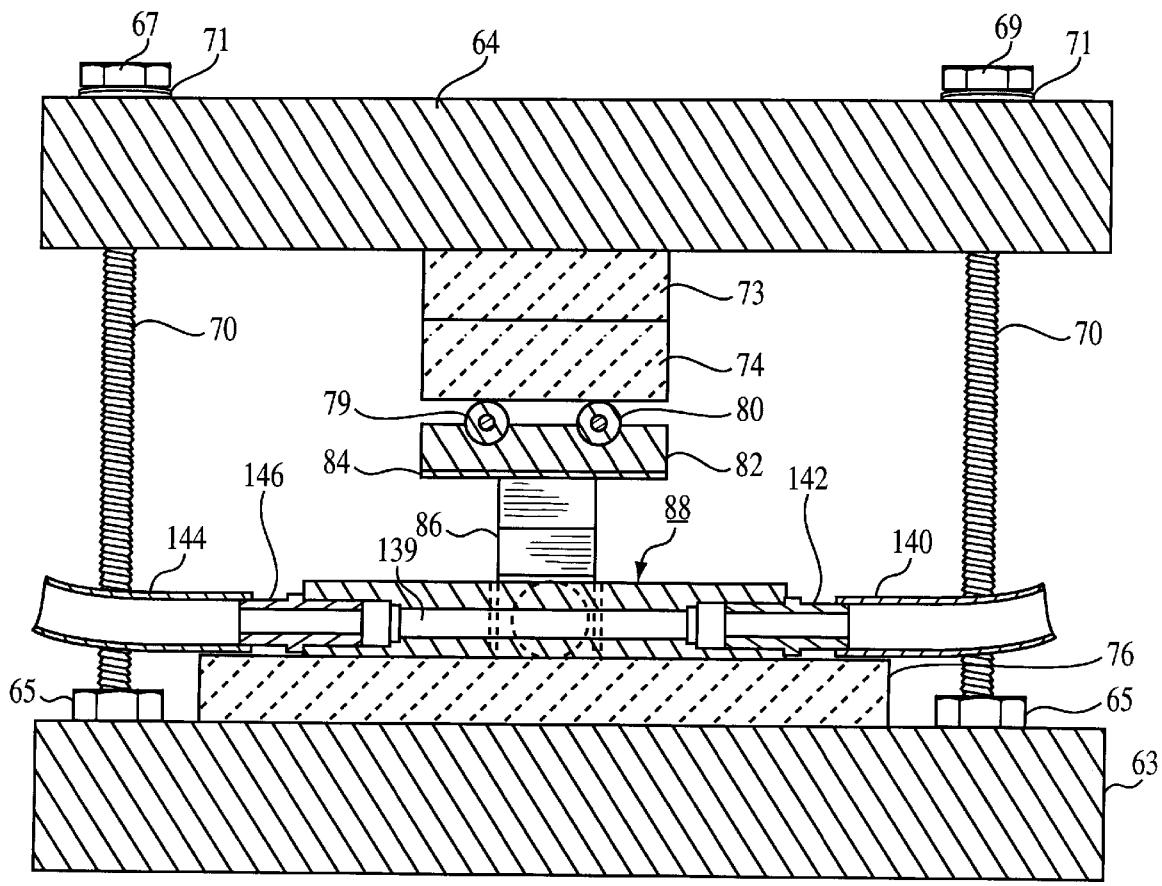
FIG. 4 is an end elevational view in section of the thermoelectric module as taken along line 4—4 of FIG. 2; and, FIG. 5 is an exploded perspective view illustrating the shape of the heating and cooling shoes of the thermoelectric module of FIG. 2.
Figure 5:
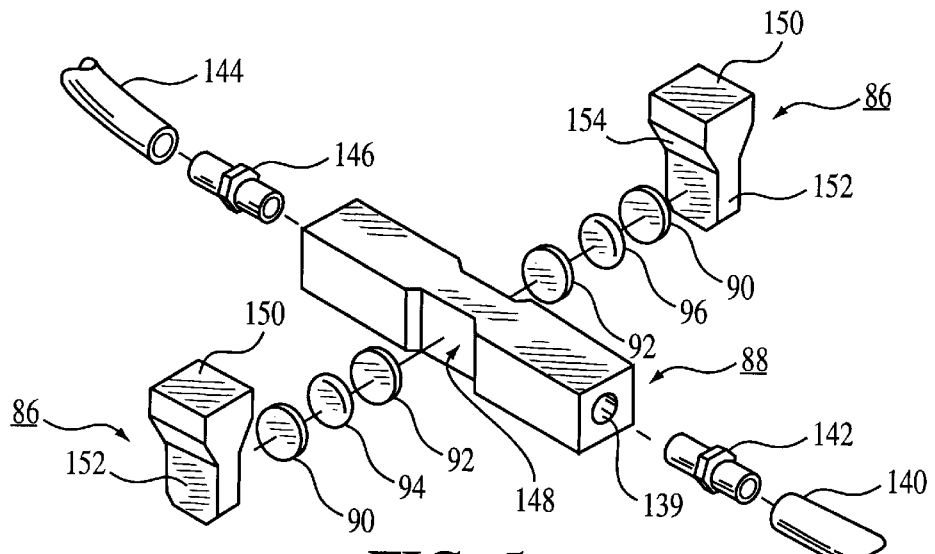

Referring now to FIGS. 2, 4 and 5, each of the intermediate cold shoes 88 and the two end cold shoes 114 and 126 have a central fluid passage 139 connected to a source of cooling fluid, such as water, by a corresponding inlet conduit 140 and inlet nipple 142, and by a corresponding outlet conduit 144 and outlet nipple 146. Each of the cold shoes preferably has an hourglass shape, such as shown in FIG. 5, providing an intermediate channel portion 148 for positioning the thermoelectric wafers and their corresponding shims. The hot shoes 86 have a T-shape and are of a depth at least equal to the diameter of the thermoelectric wafers to provide relatively large heat transfer surfaces over the top 150 of the shoe and on each side of the shoe along a base portion 152. Slanted upper side surfaces 154,154 connect the base 152 to the top 150 of each hot shoe.

With respect to the slanted side surfaces of each hot shoe, it is important that the size of the tungsten shims 90, 118 and 132 be of sufficient height to prevent contact between the respective thermoelectric wafers and the adjacent slanted surface, because such contact may cause significant corrosion and deterioration of both the wafer and the hot shoe.

The following is an example of a specific thermoelectric module construction in accordance with the teachings of the invention. This construction is composed of 20 thermoelectric wafers (10 of the N-type and 10 of the P-type), 10 copper hot shoes and 11 copper cold shoes. As best shown in FIGS. 2 and 3, the wafers and conducting shoes are arranged "in-line". The wafers are cylindrical in shape having a diameter of approximately 0.1 inch. The cold shoes are copper pieces with an hour-glass shape and have a 0.125 inch coolant passage passing through their length. The lead shims are 0.005 inches thick and separate the thermoelectric material from the cold shoes. Similarly, the tungsten shims are 0.008 inches thick and separate the thermoelectric material from the hot shoes.

The mounting fixture 60 is fabricated from 0.5 inch aluminum stock, and a ⅜ inch bolt 104 is threaded horizontally through the left end wall 106 of the mounting fixture to preload the electricity generating units of the module. Ceramic plates 73,74 and 76 provide thermal and electrical insulation between the electricity generating elements and the mounting fixture. The electrical leads 164 and 166 connected to the copper bus bars 112 and 124 at opposite ends of the module are made from copper AWG No. 6 wire. These large size leads are preferred because of their low resistance, which increases the module efficiency.

The heat input is provided by two 6-inch long, one-quarter inch diameter, 400 watt cartridge heaters. The heaters are mounted side by side in semi-circular grooves of corresponding cross-sectional size and shape, which are cut in a 0.75 inch wide, 6 inch long and 0.25 inch thick copper strip. On the underside of this heater support strip 82 is a 0.001 to 0.002 inch thick layer 84 of mica to provide electrical insulation between the heater support strip 82 and the hot shoes 86. The material of layer 84 should have good thermal conductivity. To electrically and thermally insulate the cartridge heaters 79 and 80 from the upper plate 64 of the mounting fixture, the top of these heaters is covered by two layers or plates 73 and 74 of machinable ceramic insulation.

The copper strip heaters are in intimate contact with the hot shoes because the module is preloaded vertically with the bolts 66–69. As previously described, Belleville washers 71 are used under the bolt heads to provide compliance in the vertical direction to accommodate thermal expansion in this direction. After the electricity generating units 98 and the end units 100 and 102 are assembled and then preloaded horizontally and vertically, the resulting module is preferably encased in a plastic matrix to shield it from the oxidizing environment inherent in ambient conditions.

Although demineralized water may be preferable because of its higher electrical resistance, tap water is sufficient as the cooling media for the cold shoes because its resistance is high enough to allow satisfactory operation of the module. In other words, the mineral content of tap water provides a relatively small and insignificant short circuit path, resulting in only a slight decrease in the module efficiency. The cooling system may use ⅛ inch plastic tubing and miniature tubing nipples to connect the cold shoes to ported inlet and outlet water manifolds (not shown). In this specific construction, the total cooling water flow rate through the entire array of cold shoes may be maintained at about 1 gallon per minute (gpm).

Thermoelectric modules generate electricity by utilizing the Seebeck effect wherein an electric potential is generated by imposing a temperature gradient across thermoelectric materials. An important feature of the "in-line" configuration of the present invention is that the heat flow is perpendicular to the current flow. As may be seen best in FIG. 2, the thermoelectric wafers are heated through the hot shoes in which the heat is conducted vertically and are cooled through the cold shoes from which heat is removed by cooling water flowing horizontally in a direction perpendicular to the horizontal direction in which the current flows, all with reference to the horizontal orientation of the mounting fixture as shown in the drawings.

After the thermoelectric module has been assembled, it is preferably conditioned with AC power in order to reduce its electrical resistance. An example of such a conditioning procedure is as follows: measure the module resistance, apply AC power of about 50 amps, activate the cartridge heaters to bring the hot side of the thermoelectric wafers up to a steady state temperature of about 900° F., remove the AC power, allow the module to cool to ambient temperature, and again measure the module resistance. This process should reduce the module resistance from about 1.3 ohms to about 0.3 ohms. Such conditioning is preferred because decreased resistance improves module efficiency by preventing a power loss corresponding to the amount of resistance eliminated.

Once the module has been conditioned, it is best to initiate the next heatup slowly (less than 1° F. per second) to ensure that if any problems exist, such as electrical shorts, line leakage or heater failure, then the problems can be resolved before the module is damaged. Although faster heatup rates may be subsequently used, moderate heatup and cool down rates may extend the life of the module by avoiding excessive thermal stresses that could damage the thermoelectric materials. Once the hot side of the thermoelectric materials have reached the desired temperature, such as about 800 to 900° F. the heat input by the cartridge heaters is leveled off to maintain this steady state operating temperature.

Many modifications to the module of the present invention are possible while still using the inventive features thereof. Such modifications may occur to those skilled in the art when they learn of the invention. For example, other types of heating arrangements may be employed, such as a Borelectric heater that is relatively thin and has an electrically insulating layer over its contact surface. Also, a hot fluid may be used instead of electricity to provide heat to the hot shoes. Other modifications include using thermoelectric wafers having a rectangular shape instead of a round shape, or some other shape adapted to fit better between the hot and cold shoes so as to improve the efficiency and power output of the module.

It may also be possible to develop a thermoelectric material, or an economical shoe material, that would not require the use of lead and tungsten shims to avoid corrosion. Although it is already known that hot and cold shoes machined from tungsten could be used to eliminate the lead and tungsten shims, the use of these shims is more desirable because the thermal conductivity of tungsten is significantly lower than that of copper and the cost of tungsten is significantly higher than that of copper. However, it is believed that the elimination of these shims would improve unit efficiency. In addition, a number of other modifications to the elements and components of the invention, as specifically described herein, are possible without departing from the scope of the invention, which is defined by the claims set forth below.

What is claimed is:

1. A thermoelectric module comprising at least one electricity generating unit having a first end and a second end and further comprising:

a first thermoelectric element made of a thermoelectric material, a second thermoelectric element made of a thermoelectric material, a hot member made of an electrically conductive material and arranged to heat one side of said first thermoelectric element and to heat one side of said second thermoelectric element, a cold member made of an electrically conductive material and arranged to cool another side of said first thermoelectric element and to cool one side of said second thermoelectric element, wherein said hot member, said first thermoelectric element, said cold member and said second thermoelectric element are supported in a fixture means, are electrically connected respectively to provide said electricity generating unit, and are arranged respectively in positions along an in-line axis, and wherein said module further comprises:

in-line clamping means for clamping said first and second thermoelectric elements and said first hot and cold members in said respective in-line positions, means for connecting the first and second ends of said electricity generating unit to an electrical circuit, heating means for heating said hot member, and cooling means for cooling;

wherein said fixture means comprises a lower mounting plate, a lower insulating plate one side of which is supported by said lower mounting plate and the other side of which supports said generating unit, an upper insulating plate supported by said generating unit, an upper mounting plate supported by said upper insulating plate, and compressing means for resiliently engaging said upper mounting plate and said lower mounting plate to clamp therebetween said upper and lower insulating plates and said generating unit, said resilient engagement being provided by resilient means positioned between said compressing means and at least one of said mounting plates to prevent excessive clamping forces due to thermal expansion when said hot member is heated by said heating means.

2. A thermoelectric module according to claim 1, wherein said in-line clamping means comprises loading means for applying a compressive force to one of the ends of said generating unit, and a stop means for applying a resistance to said compressive force to the other of the ends of said generating unit.

3. A thermoelectric module according to claim 2, wherein said in-line clamping means comprises a loading end wall, and wherein said loading means comprises a loading bolt in threaded engagement with said loading end wall, and a loading bar engaged by an inner end of said loading bolt.

4. A thermoelectric module according to claim 3, wherein said in-line clamping means further comprises a stop wall positioned opposite to said loading wall to resist said compressive force, and resilient means located between said stop wall and the other of the first and second ends of said generating unit to prevent excessive stresses due to thermal expansion when said hot member is heated by said heating means.

5. A thermoelectric module according to claim 1, wherein said heating means comprises at least one electric heater and a heater support plate positioned between said upper insulating plate and an upper heat transfer surface of the hot member of said generating unit.

6. A thermoelectric module according to claim 5, wherein said hot member has a T-shape, and wherein said upper heat transfer surface extends along a top portion of said T-shape.

7. A thermoelectric module according to claim 5, wherein said cold member has an hourglass shape providing recesses on opposite sides thereof each for positioning a corresponding thermoelectric element.

8. A thermoelectric module according to claim 5, wherein said cold member has an elongated shape, and wherein said cooling means comprises a coolant passage extending along a longitudinal axis of said cold member and means for providing a flow of coolant through said coolant passage.

9. A thermoelectric module according to claim 1, wherein said module comprises a plurality of said generating units arranged in end-to-end positions along said in-line axis with each generating unit being adjacent to another generating unit and said generating units being clamped in said end-to-end positions by said in-line clamping means.

10. A thermoelectric module according to claim 9, wherein said plurality of generating units are positioned intermediate between a loading end generating unit and a resisting end generating unit; wherein said loading end generating unit comprises a loading end cold member made of an electrically conductive material and arranged to be cooled by said cooling means, a loading end thermoelectric element one side of which is arranged to be heated by the hot member of one of said plurality of intermediate generating units and the other side of which is arranged to be cooled by said loading end cold member, and a loading end bus bar in electrical connection with said loading end cold member and forming a part of said connecting means; wherein said resistance end generating unit comprises a resistance end cold member made of an electrically conductive material and arranged to be cooled by said cooling means, a resistance end thermoelectric element one side of which is arranged to be heated by the hot member of another of said plurality of intermediate generating units and the other side of which is arranged to be cooled by said resistance end cold member, and a resistance end bus bar in electrical connection with said resistance end cold member and forming a part of said connecting means; and wherein the cold members and thermoelectric elements of said end generating units are arranged in positions along said in-line axis.

11. A thermoelectric module according to claim 9, wherein physical contact between said hot member and said first thermoelectric element is prevented by a shim made of tungsten, and physical contact between said cold member and said second thermoelectric element is prevented by a shim made of lead.

12. A thermoelectric module according to claim 9, wherein one of said first and second thermoelectric elements is of the N-type and the other of said first and second elements is of the P-type.

13. A thermoelectric module according to claim 1, wherein said heating means is positioned between said upper insulating plate and an upper heat transfer surface of the hot member of said generating unit.

14. A thermoelectric module according to claim 1, wherein said hot member has a T-shape and a heat transfer surface extending along at top portion of said T-shape.

15. A thermoelectric module according to claim 1, wherein said cold member has an hourglass shape providing recesses on opposite sides thereof each for positioning a corresponding thermoelectric element.

16. A thermoelectric module according to claim 1, wherein said cold member has an elongated shape, and wherein said cooling means comprises a coolant passage extending along a longitudinal axis of said cold member and means for providing a flow of coolant through said coolant passage.

17. A thermoelectric module according to claim 1, wherein a current is generated by said generating unit and flows in a direction of said in-line axis, wherein heat is transferred through said hot member in a first direction and heat is transferred through said cold member in a second direction, and wherein said first and second directions are substantially perpendicular to each other and to said in-line axis.

18. A thermoelectric module according to claim 1, wherein one of said first and second thermoelectric elements is of the N-type and the other of said first and second thermoelectric elements is of the P-type.

* * * * *